(12) United States Patent
Hockenberry et al.

(10) Patent No.: US 6,991,278 B2
(45) Date of Patent: Jan. 31, 2006

(54) SEALING SYSTEMS AND RELATED METHODS FOR AUTOMOTIVE INTERIOR TRIM PANELS AND THE LIKE

(75) Inventors: Todd L. Hockenberry, Beaver, PA (US); Jeffrey W. Jones, Shaker Heights, OH (US); Daniel J. Cellura, Parma, OH (US); William G. Bradac, North Olmsted, OH (US); Gregory W. Shimola, Westlake, OH (US)

(73) Assignee: The XLO Group of Companies, Inc., Cleveland, OH (US)

( * ) Notice: Subject to any disclaimer, the term of this patent is extended or adjusted under 35 U.S.C. 154(b) by 62 days.

(21) Appl. No.: 10/137,542

(22) Filed: May 2, 2002

(65) Prior Publication Data

US 2003/0001408 A1 Jan. 2, 2003

Related U.S. Application Data

(60) Provisional application No. 60/288,379, filed on May 3, 2001.

(51) Int. Cl.
*B60J 5/00* (2006.01)

(52) U.S. Cl. .................................. 296/146.7; 296/39.1

(58) Field of Classification Search ................. 296/191, 296/154, 146.7, 39.1; 49/502
See application file for complete search history.

(56) References Cited

U.S. PATENT DOCUMENTS

| | | | |
|---|---|---|---|
| 4,469,732 A | 9/1984 | Isaksen et al. | |
| 4,588,627 A | 5/1986 | Isaksen et al. | |
| 4,604,302 A | 8/1986 | Isaksen et al. | |
| 4,696,848 A | 9/1987 | Jones et al. | |
| 4,848,829 A | * 7/1989 | Kidd | ........................ 296/39.1 |
| 4,957,803 A | 9/1990 | Foley | |
| 5,090,762 A | 2/1992 | Krieger | |
| 5,261,447 A | 11/1993 | Boticki | |
| 5,322,722 A | 6/1994 | Rozenberg | |
| 5,405,672 A | 4/1995 | Takiguchi et al. | |
| 5,482,343 A | 1/1996 | Bradac | |
| 5,560,967 A | 10/1996 | Isaksen | |
| 5,588,260 A | 12/1996 | Suzuki et al. | |
| 5,902,004 A | 5/1999 | Waltz et al. | |
| 5,904,002 A | * 5/1999 | Emerling et al. | ............. 49/502 |
| 5,936,818 A | 8/1999 | Maue et al. | |
| 6,142,556 A | * 11/2000 | Tanaka et al. | ........... 296/146.7 |
| 6,183,038 B1 | 2/2001 | Hansen et al. | |
| 6,185,872 B1 | 2/2001 | Seeberger et al. | |

(Continued)

*Primary Examiner*—Jason Morrow
(74) *Attorney, Agent, or Firm*—Fay, Sharpe, Fagan, Minnich & McKee, LLP (57) ABSTRACT

A combined trim panel and water shield includes a water shield having opposite first and second surfaces, and is of a size and shape to generally conform to a door panel and a trim panel to be protected. The trim panel is configured to cover a vehicle door panel and has a first surface configured to face an interior compartment of the vehicle and a second surface opposite the first surface. A first sealing layer, applied in a predetermined pattern, engages the first surface of the water shield and the second surface of the trim panel. A second sealing layer, applied in a predetermined pattern, engages the second surface of the water shield. In a further aspect, a sealing system is provided for application to a vehicle interior trim panel to prevent the entry of water or dust into an interior compartment of the vehicle. The system includes a trim panel configured for covering a vehicle door panel wherein the trim panel has a first surface configured to face an interior compartment of the vehicle and a second surface opposite the first surface. At least one compressible sealing member engages the trim panel and provides a sealing interference between the vehicle door panel and the trim panel when the trim panel is installed on the door panel.

28 Claims, 5 Drawing Sheets

U.S. PATENT DOCUMENTS

| | | |
|---|---|---|
| 6,196,606 B1 | 3/2001 | McGoldrick |
| 6,197,403 B1 | 3/2001 | Brown et al. |
| 6,238,507 B1 | 5/2001 | Jones et al. |
| 6,308,488 B1 | 10/2001 | Hoshino |
| 6,332,641 B1 | 12/2001 | Okana |
| 6,393,767 B1 | 5/2002 | Fukumoto et al. |
| 6,409,250 B1 | 6/2002 | Schultheiss |
| 6,412,852 B1 | 7/2002 | Koa et al. |
| 6,420,049 B1 | 7/2002 | Restaino et al. |
| 6,422,640 B2 | 7/2002 | Whitehead et al. |
| 6,428,081 B1 * | 8/2002 | Williams et al. ......... 296/146.7 |
| 6,438,899 B1 | 8/2002 | Feder et al. |
| 6,450,565 B2 | 9/2002 | Yamamoto |
| 6,619,724 B2 * | 9/2003 | Blomeling et al. ...... 296/146.7 |
| 2002/0170235 A1 * | 11/2002 | Petroski et al. ................ 49/502 |

* cited by examiner

SEALING SYSTEMS AND RELATED METHODS FOR AUTOMOTIVE INTERIOR TRIM PANELS AND THE LIKE

CROSS REFERENCE TO RELATED APPLICATIONS

The present application claims the benefit of the filing date of U.S. Provisional Application No. 60/288,379 filed on May 3, 2001, the disclosure of which is hereby incorporated by reference.

FIELD OF THE INVENTION

The present invention relates generally to sealing or gasketing and, more particularly, to systems and methods for sealing an interior compartment of a vehicle against entry of water, wind, noise, dust, or other environmental contamination. The system and method of the invention are particularly adapted for use in an automobile and will be described with particular reference thereto. However, it will be appreciated that the invention has broader applications and may be used to provide a water-tight seal in many different environments, such as other types of overland vehicles, watercraft, aircraft, washing machines, automatic dishwashers, and so forth.

BACKGROUND OF THE INVENTION

The metal inner panel of a vehicle door has a plurality of openings and holes therein for mounting certain accessories and mechanisms in the door and for providing access to such accessories and mechanisms. By way of example, the inner panel of a vehicle door may have openings and holes for mounting such items as window operating mechanisms, locks and lock switches, side-view mirror controllers, loudspeakers, and so forth.

A decorative interior trim panel and arm rest are conventionally applied over the inner panel of a vehicle door. Commonly, a water deflector or shield is applied between the inner door panel and interior door trim for preventing entry of water, dirt, and the like into the vehicle body or causing damage to the interior door trim itself. Heretofore, the normal practice has been to secure a water deflector over the inner door panel prior to installing the trim panel.

Therefore, as recognized by the present invention, there exists a need in the art for a combined trim panel and water deflector or shield which permits the water deflector to be installed simultaneously with the trim panel. As further recognized by the present invention, there exists a need in the art for a door trim sealing system which obviates the need for a separate water deflector or shield.

SUMMARY OF THE INVENTION

In a first aspect, a combined trim panel and water shield includes a water shield having opposite first and second surfaces, and which is of a size and shape to generally conform to a door panel and a trim panel to be protected. The trim panel is configured to cover a vehicle door panel and has a first surface configured to face an interior compartment of the vehicle and a second surface opposite the first surface. A first sealing layer, applied in a predetermined pattern, engages the first surface of the water shield and the second surface of the trim panel. A second sealing layer, applied in a predetermined pattern, engages the second surface of the water shield.

In a second aspect, a method for the production of a combined water shield and trim panel structure is provided. The method comprises providing a trim panel which is configured to cover a door panel, and which has a first surface configured to face an interior compartment of a vehicle. A sealing member, which may be a flat or shaped sheet of material having opposite first and second surfaces is also provided. The sealing member is of a size and shape to generally conform to the trim panel and the door panel. A first sealing material is applied to the first surface of the sheet in a first predetermined pattern, and a second sealing material is applied to the second surface of the sheet in a second predetermined pattern. The sheet and the trim panel are aligned so that the first surface of the sheet is in facing relation with a second surface of the trim panel opposite the first surface thereof. The trim panel is contacted with the first sealing member to attach the trim panel to the water shield. In a more limited aspect, a protective liner of plastic or other material is removably attached to the second sealing layer and is removed when the combined water shield/trim panel is installed on the door.

In a third aspect, a sealing system for application to a vehicle interior trim panel for preventing the entry of water or dust from entering an interior compartment of the vehicle includes a trim panel configured for covering a vehicle door panel, the trim panel having a first surface configured to face an interior compartment of the vehicle and a second surface opposite the first surface. The sealing system further includes at least one compressible sealing member engaging the trim panel and providing a sealing interference between the vehicle door panel and the trim panel when the trim panel is installed on the door panel.

In a fourth aspect, a method for sealing a vehicle door interior trim panel against entry of water or dust includes attaching at least one compressible sealing member to a trim panel such that the at least one sealing member is positioned to provide a sealing interference between the door panel and the trim panel when the trim panel is installed on the door panel. The trim panel retaining the at least one compressible sealing member is then installed onto the door panel.

In a fifth aspect, a combined trim panel and water shield assembly for a vehicle includes a trim panel configured for covering a vehicle door panel, the trim panel in facing relation to an interior compartment of the vehicle. A foam layer engages and is sandwiched between the trim panel layer and the door panel. Optionally, a sealing layer for providing a seal between the flat sheet and the inner door panel, such as an adhesive or a compressible seal, is provided.

In a sixth aspect, a stacked plurality of sealing systems is provided. The stacked plurality includes a first sealing system including a trim panel adapted to cover a vehicle door panel and a sealing member engaging the trim panel and providing a sealing interference between the vehicle door panel and the trim panel. The stacked plurality also includes a second sealing system positioned adjacent the first sealing system. The second sealing system includes a trim panel adapted to cover a vehicle door panel and a sealing member engaging the trim panel. The stacked plurality of sealing systems further comprises a releasable protective liner disposed between the first and second sealing systems.

In a seventh aspect, a combined trim panel and water shield assembly includes a trim panel configured for covering a vehicle door panel, a generally flat non-compressible water shield, and an adhesive layer engaging the flat sheet to the trim panel.

In an eighth aspect, a combined trim panel and water shield assembly includes a trim panel configured for covering a vehicle door panel, a generally flat non-compressible water shield, and an adhesive layer engaging the flat sheet and adapted to engage the vehicle door panel.

One advantage of the present invention is found in that combining the water shield and trim panel or, alternatively, eliminating the water shield, reduces the number of parts needed to make the automobile and simplifies assembly of the automobile.

Further advantages of the present invention reside in its ease, accuracy, and repeatability of installation.

Another advantage is that many add-on parts used in door trim can be eliminated, thereby reducing noise, vibration, and harshness (NVH) and buzz, squeak, and rattle (BSR) issues.

Yet another advantage resides in the fact that by eliminating a separate water shield component, additional door components can be packaged to the trim panel.

Still a further advantage is found in that the door sealing system is self-locating and eliminates the need for part application in the assembly plant.

Another advantage is found in that rework, repair, and service are made easier.

Another advantage of the invention resides in its ease of disassembly, recycling, and the like, e.g., at the end of vehicle life.

Yet another advantage resides in that the number of parts can be reduced by adding them to the module.

Still further benefits and advantages of the present invention will become apparent to those of ordinary skill in the art upon reading and understanding the following detailed description of the preferred embodiments.

It is to be understood that both the foregoing general description and the following detailed description are exemplary and explanatory only and are not restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The following detailed description may be best understood when read in reference to the accompanying drawings wherein similar reference characters denote similar elements throughout the several views.

DETAILED DESCRIPTION OF THE PREFERRED EMBODIMENTS

FIG. 1 and FIGS. 2A–2F show a typical vehicle door 10 incorporating a combined trim panel and water shield construction 18 in accordance with the subject invention. The door 10 includes inner and outer door panels 12 and 14, respectively, secured together with a space therebetween for accommodating various mechanisms. A window 16 is shown for door 10 and moves into the space defined between the inner and outer door panels in a known manner.

Figure 1:
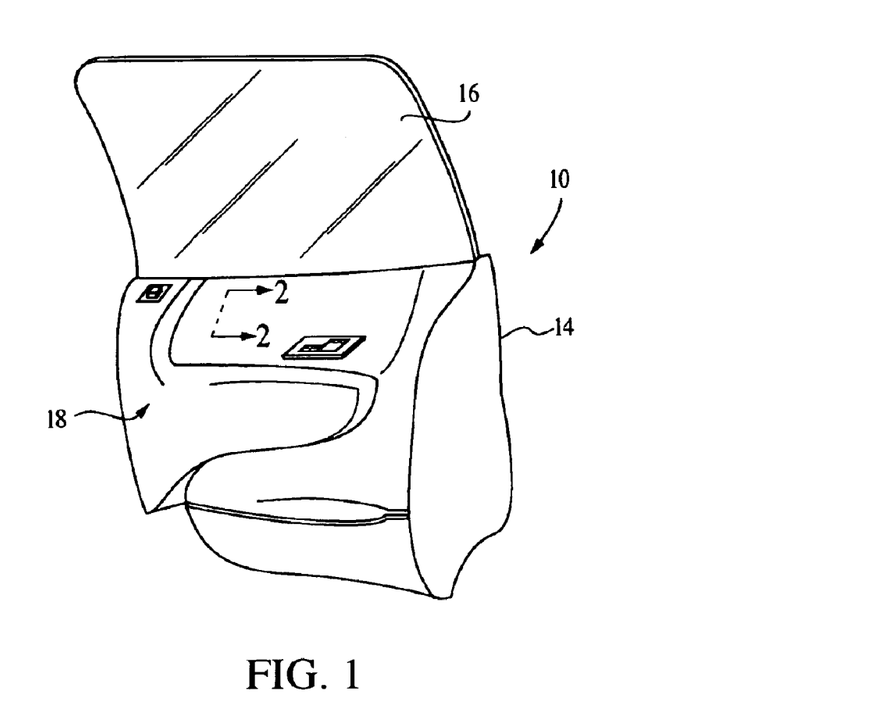
FIG. 1 shows an automobile door employing the combined water deflector and trim panel formed according to a first embodiment of the present invention.
Figure 2A:
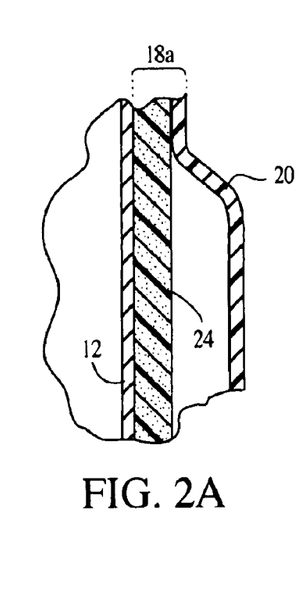
FIGS. 2A–2F are cross-sectional views of six different embodiments of the combined water shield and trim panel taken along line 2—2 of FIG. 1.

Referring now to FIG. 2A, a fragmentary cross-sectional view is shown of a combined interior trim panel and water shield 18a of the present invention. The combined unit is peripherally shaped to substantially cover the inner door panel 12. The combined trim panel and water deflector 18a includes decorative trim panel layer 20 and compressible water shield layer 24 disposed between the sheet metal 12 and the decorative trim panel 20. Optionally, the compressible shield 24 can be placed on or secured to the trim panel 20 at a centralized location and installed onto the door as a single unit. At least a portion of the water shield 24 has a cross-sectional thickness, which may be varied or uniform, which is greater than the width of the space to be sealed, such that the material is compressed when the trim panel is installed on the door, the compression providing a sealing pressure between the door panel 12 and the trim panel shell 20. Preferably, the compressed areas form a seal about the door panel periphery or other areas where prevention of water entry is desired.

Figure 2B:
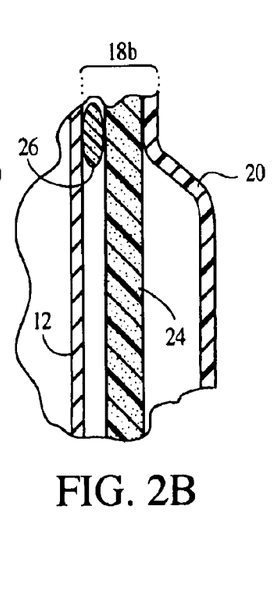

Referring now to FIG. 2B, combined trim panel and water deflector 18b includes decorative trim panel layer 20 and a compressible water shield layer 24. A sealing layer or coating 26 is disposed between the compressible shield member 24 and the door panel 12. The sealing layer 26 preferably forms a continuous ribbon or bead about the periphery of the water shield layer 24, although use of discontinuous bands is also contemplated. The sealing material may be provided to additional areas within the peripheral bands to assist in holding or sealing the middle area of the deflector layer 24 with respect to the inner door panel 12. The sealing material 26 may comprise an adhesive or a compression-type gasket or seal formed of a compressible or resilient material, such as a formed-in-place (FIP) gasket.

Optionally, the combined unit 18b can be assembled at a centralized location and installed onto the door as a single unit. A protective sheet of material (not shown) can be removably attached over the layer 26 for handling and is removed prior to installing the unit. Again, the sealing materials 24 and 26 are of a size and configuration such that they are compressed to form a sealing engagement when the unit is installed on the door, e.g., at the door panel periphery or other areas where prevention of water entry is desired.

Figure 2C:
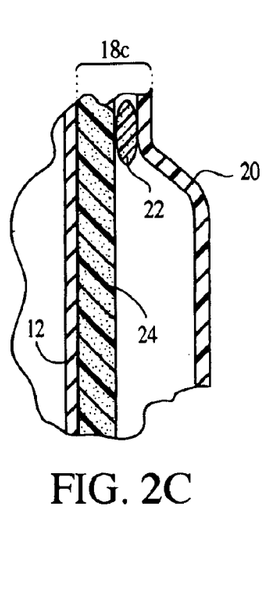

Referring now to FIG. 2C, combined trim panel and water deflector 18c includes decorative trim panel layer 20 and a compressible water shield layer 24. A sealing layer or coating 22 is disposed between the compressible shield member 24 and the trim panel shell 20. The sealing layer 22 preferably forms a continuous ribbon or bead about the periphery of the water shield layer 24, although use of discontinuous bands is also contemplated. The sealing material may be provided to additional areas within the peripheral bands to assist in holding or sealing the middle area of the deflector layer 24 with respect to the trim panel 20. The sealing material 22 may comprise an adhesive or a compression-type gasket or seal formed of a compressible or resilient material, such as a formed-in-place (FIP) gasket.

Again, the combined unit 18c can optionally be assembled at a centralized location and installed onto the door as a single unit. Again, the sealing materials 24 and 22 are of a size and configuration such that they are compressed to form a sealing engagement when the unit is installed on the door, e.g., at the door panel periphery or other areas where prevention of water entry is desired.

Figure 2D:
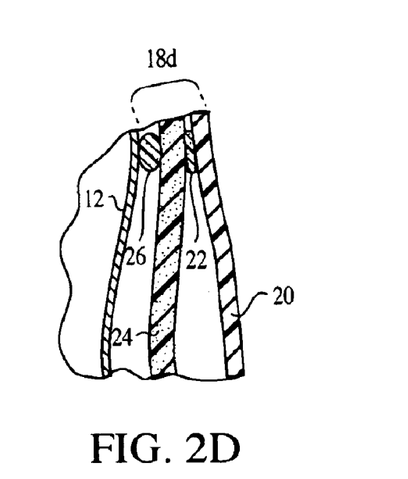

Referring now to FIG. 2D, a combined trim panel and water deflector 18d includes a decorative trim panel layer 20 and a water shield layer 24 which are adhesively bonded by a first seal layer 22. The combined trim panel and water shield 18d further includes a second sealing layer 26 which affixes water shield layer 24 to the inner door panel 12. The sealing layers 22 and 26, which may be the same or different, preferably each form a continuous ribbon or bead about the periphery of the water shield layer 24, although use of discontinuous bands is also contemplated. The sealing material may be provided to additional areas within the peripheral bands to assist in holding the middle area of the deflector layer 24 to the inner door panel 12 and/or trim panel layer 20.

The combined unit 18d can optionally be assembled at a centralized location for installation as a single unit. A protective sheet of material (not shown) can be removably attached over the layer 26 for handling and is removed prior to installing the unit. The sealing materials 22, 24, and 26 are of a size and configuration such that they are compressed to form a sealing engagement when the unit is installed on the door, e.g., at the door panel periphery or other areas where prevention of water entry is desired.

Figure 2E:
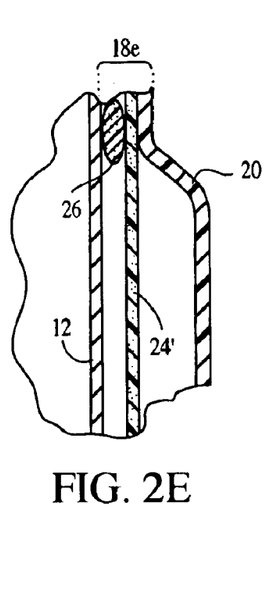

Referring now to FIG. 2E, a combined trim panel and water deflector 18e includes decorative trim panel layer 20 and a rigid, non-compressible water shield layer 24', e.g., formed of a rigid plastic or other material. A sealing layer or coating 26 is disposed between the rigid shield member 24' and the door panel 12. The sealing layer 26 preferably forms a continuous ribbon or bead about the periphery of the water shield layer 24, although use of discontinuous bands is also contemplated. The sealing material may be provided to additional areas within the peripheral bands to assist in holding or sealing the middle area of the deflector layer 24 with respect to the inner door panel 12. The sealing material 26 may comprise an adhesive or a compression-type gasket or seal formed of a compressible or resilient material, such as a formed-in-place (FIP) gasket.

Optionally, the combined unit 18e can be assembled at a centralized location and installed onto the door as a single unit. A protective sheet of material (not shown) can be removably attached over the layer 26 for handling and is removed prior to installing the unit. Again, the sealing material 26 is of a size and configuration such it is compressed to form a sealing engagement between the door panel 12 and the rigid shield 24' when the unit 18e is installed on the door, e.g., at the door panel periphery or other areas where prevention of water entry is desired.

Figure 2F:
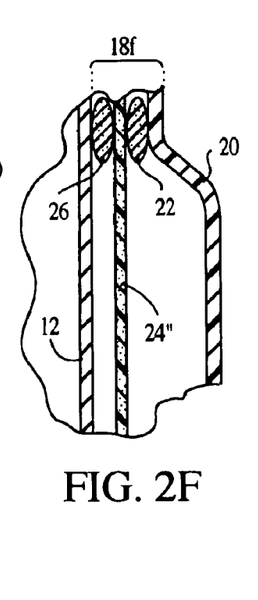

Referring now to FIG. 2F, a combined trim panel and water deflector 18f includes a decorative trim panel layer 20 and a water shield layer 24" which are adhesively bonded by a first seal layer 22. The combined unit 18f further includes a second sealing layer 26 which affixes water shield layer 24" to the inner door panel 12. The sealing layers 22 and 26, which may be the same or different, preferably each form a continuous ribbon or bead about the periphery of the water shield layer 24", although use of discontinuous bands is also contemplated. The sealing material may be provided to additional areas within the peripheral bands to assist in holding the middle area of the deflector layer 24" to the inner door panel 12 and/or trim panel layer 20.

The combined unit 18f can optionally be assembled at a centralized location for installation as a single unit. A protective sheet of material (not shown) can be removably attached over the layer 26 for handling and is removed prior to installing the unit. Again, the sealing materials 22 and 26 are of a size and configuration such that they are compressed to form a sealing engagement when the unit is installed on the door, e.g., at the door panel periphery or other areas where prevention of water entry is desired.

In reference now to FIGS. 2A–2F, the combined trim panel and water shield of each of the above-described embodiments 18a–18f functions to deflect water entering the space between the inner and outer door panels. The water is thus kept within the door assembly for drainage out through conventional bottom drain openings instead of wetting the inner door trim panel layer 20 or entering the interior compartment of the vehicle.

The trim panel layer 20 generally comprises a structural material, such as a plastic, metal, composite, laminate, or other material generally used in the construction of automotive interior trim panels, which is molded or otherwise formed to the needed functional and aesthetic shape. The trim panel layer may further include decorative materials, such as cloth, leather, plastic, foam, vinyl, or other material generally used in the construction of automotive interior trim panels.

In the depicted embodiments of FIGS. 2A–2D, the water shield layer 24 comprises a foam material, such as open- or closed-cell polyurethane, polypropylene, polyethylene, and so forth. In the embodiment depicted in FIG. 2E, the water shield layer 24' comprises a non-compressible and generally nonflexible or rigid plastic material. In FIG. 2F, the deflector layer 24" is a polymer film, such as polyethylene film, corona surface-treated polyethylene film, and the like.

In the embodiments of FIGS. 2B–2F, having one or both of the sealing coatings or bands 22 and 26, such layers are form of an adhesive or a compression-type gasket or seal. The adhesive may be, for example, a temporary or removable pressure-sensitive adhesive, or a generally permanent pressure-sensitive adhesive. In the embodiments of FIGS. 2D and 2F, wherein both of the layers 22 and 26 are present, the composition, pattern, thickness, and/or orientation of the layers may be the same or different.

When a compression type seal is employed as the layer 22 and/or 26, it may have sufficient tack to adhere to the water shield layer or, alternatively, it may be adhesively bonded to the water shield layer by, for example, using an adhesive, such as a pressure-sensitive adhesive.

A compression-type seal employed in conjunction with the present invention comprises a flexible, resilient, or compressible material. Such materials include flexible plastic, rubber, elastomers, silicone, foam rubber, synthetic foam materials, gels, and the like. Such seals or gaskets can be formed separately, or more preferably, can be dispensed directly onto the water deflector in an uncured state and allowed to cure. A preferred compression seal comprises a polyurethane foam.

As illustrated in FIGS. 2A–2D, the water deflector substrate 24 comprises a compressible or resilient material, such as a foam or the like, and one or both of the sealing layers 22 and 26 can optionally be omitted. Finally, when a rigid, non-compressible water shield substrate 24" is employed (FIG. 2F), the first and second sealing layers 22 and 26 are selected from adhesives and compression-type seal or gasket materials, and may the same or different. When the flexible, non-compressible substrate 24' is used (FIG. 2E), sealing layer 22 on the trim panel side is omitted and sealing layer 26 on the door panel side is either an adhesive or a compression-type sealing layer. The combinations of sealing layers for compressible, rigid non-compressible, and flexible non-compressible substrates are listed in TABLE 1 below.

TABLE 1

| | Coating on Trim Panel Side | Coating on Door Panel Side |
|---|---|---|
| Compressible Water Shield Substrate | None | None |
| | None | Adhesive |
| | None | Compression Seal |
| | Adhesive | None |
| | Adhesive | Adhesive |
| | Adhesive | Compression Seal |
| | Compression Seal | None |
| | Compression Seal | Adhesive |
| | Compression Seal | Compression Seal |
| Flexible, Non-compressible Water Shield Substrate | Adhesive | Adhesive |
| | Adhesive | Compression Seal |
| | Compression Seal | Adhesive |
| | Compression Seal | Compression Seal |
| Rigid, Non-compressible Water Shield Substrate | None | Adhesive |
| | None | Compression Seal |

In one preferred embodiment, the layer 22 is a permanent pressure-sensitive adhesive and the layer 26 is a compression-type seal. This embodiment provides the advantage of allowing easy removal and replacement for door access and repair. In another preferred embodiment, the layer 22 comprises a first adhesive, such as a non-permanent or removable pressure-sensitive adhesive, and layer 26 comprises a second adhesive having a greater tenacity or tack than the first adhesive, which may be, for example, a nonpermanent adhesive having a higher tack or tenacity than the first or a substantially permanent adhesive. Both of these embodiments allow the trim panel and water shield to be applied as a single unit, thus eliminating the need for separate water shield application during assembly.

In construction, one or both of the first and second sealing layers, if present, are applied to the respective side of the water shield substrate, each in a preselected pattern corresponding to a desired configuration, and serve as means of attachment to aligned or mating surfaces of the trim panel layer 20 and the inner door panel sheet metal 12, respectively.

The water shields can be attached to the trim panel at a central location and the combined article 18 then applied to the door 10 as a single unit at the assembly plant. In embodiments 2B and 2D–2F, which have a layer 26 on the side of the substrate intended to face the sheet metal door panel, a protective liner, such as a release coated sheet or film, is preferably removably applied over the layer 26 for protection during processing and handling. The protective liner is a polyethylene or other plastic sheet, preferably release coated with a release agent, such as a silicone-based release material. The protective sheet is then removed prior to installation at the assembly plant. The trim panel shell 20 serves as a protection for the layer 22 if present. If the water deflectors are not preattached to the trim panel, the layer 22 can be lined with a protective sheet in like manner.

Figure 3:
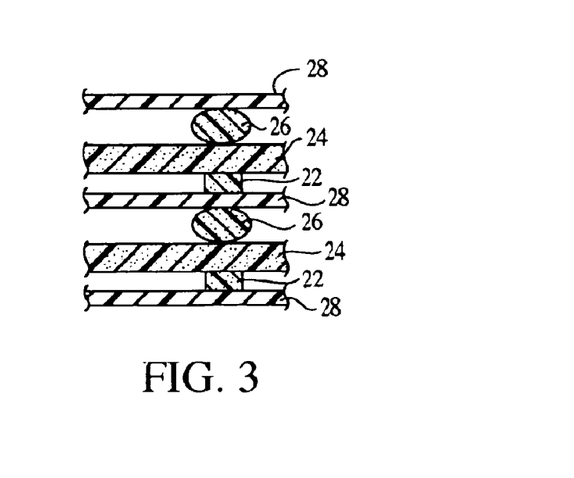
FIG. 3 is a cross-sectional view of an embodiment similar to that shown in FIG. 2D, illustrating a plurality of adhesive-coated water shields layered between successive carrier sheets.

Alternately, the units can be stacked into pads, with protective liners removably placed over the adhesive or sealing layers as necessary to separate adjacent units. As shown in FIG. 3, the water shields 24 with oppositely disposed first and second sealing layers are removably sandwiched between protective liners 28 to form a stack or pad of a desired number of water deflectors for processing, shipping, handling, and storage until use.

Referring now to FIGS. 4 and 5A–5F, there is shown an exploded view of a vehicle door 40 employing a sealing system formed in accordance with a second aspect of the subject invention in which a door panel 42 is sealed with a substrate 44 which uses sealing elements 70 and 76 formed on the door and trim panel parts.

Figure 4:
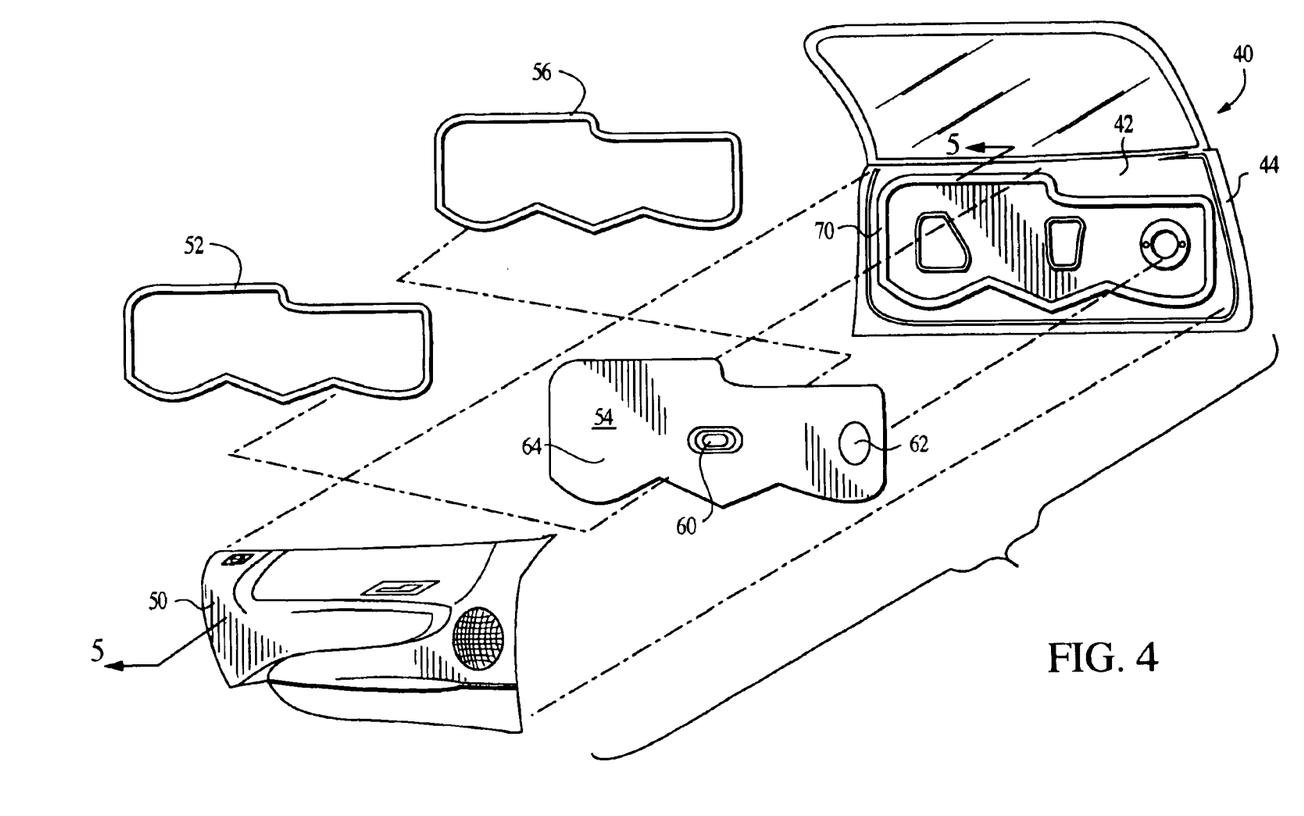
FIG. 4 is an exploded view of an automobile door employing the sealing system formed according to a second embodiment of the invention.

The door 40 generally comprises an outer panel 44 and an inner panel 42 suitably secured to the outer panel 44, such as by welding along the peripheral edge of panel 42, the panels defining an internal chamber for accommodating various internal door mechanisms.

Figure 5A:
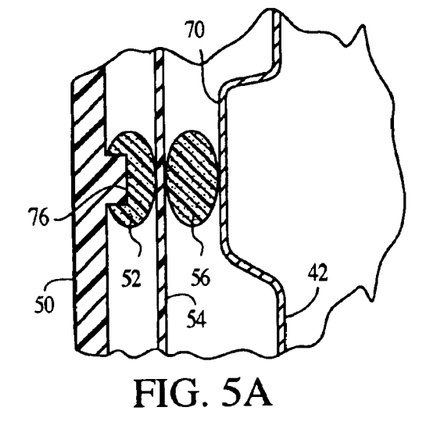
FIG. 5A is a cross-sectional view taken along line 5—5 of FIG. 4.

A trim panel 50 is installed over the inner panel to form the interior surface of the door 40 and to overlie the various door-mounted components. The trim panel is attached to the inner door panel using clips, screws, snap-type fasteners, and the like, in a known manner. A water shield 54, which may be a flat or shaped sheet of material, is located between the door panel 42 and the trim panel layer 50. Various openings, e.g., openings 60, 62 and 64, may be provided in the substrate 54 for loudspeaker, wire, door handle, lock rod, and other attachment and pass-through points. In the embodiment of FIGS. 4 and 5A, a first sealing material 52, which may be an adhesive or a compression-type gasket material, is disposed between the deflector 54 and the trim panel 50. A second sealing layer 56 which is also an adhesive or a compression-type gasket material, and which may be the same as or different than the layer 52 is located between the panel 42 and the substrate 54.

The compression seal or adhesive layers 52 and 56 are applied in a predetermined pattern which is in aligned relationship with respect to certain design features or sealing elements of the inner door panel and the trim panel when the trim panel and door panel are placed in facing relation. In the illustrated embodiment, inner panel 42 includes a flat region 70 generally following the peripheral edge thereof. In this manner, the inner door panel can be formed with a functionally needed shape as determined by the particular door configuration and which can be generally uneven so long as at least track 70 is generally flat for sealingly engaging the sealing system of the present invention.

Referring to FIG. 5A, the sealing system includes a flexible substrate 54, e.g., a flexible plastic film, having a first sealing layer 52 facing the trim panel 50 and a second sealing layer 56 disposed on the opposite side of the substrate 54 and facing the track 70 of the door panel. The trim panel 50 further includes a raised pressure rib 76 molded thereinto for retaining and further compressing the sealing member 52.

Figure 5B:
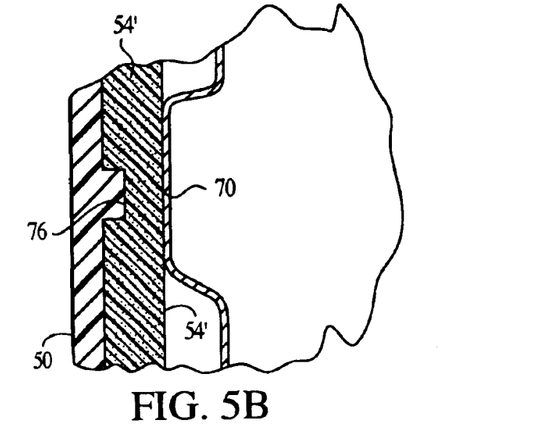
FIGS. 5B–5F illustrate alternative embodiments to that shown in FIG. 5A.

Referring now to FIG. 5B, the sealing system includes a compressible substrate 54', e.g., a compressible foam material. The substrate 54' is disposed between the trim panel 50 and the track 70 of the door panel. The trim panel 50 further includes a raised pressure rib 76 molded thereinto for retaining and further compressing the substrate 54'.

Figure 5C:
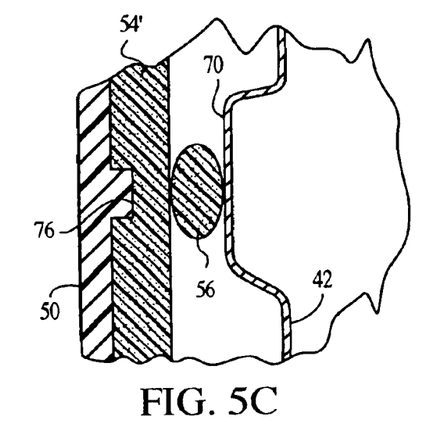

Referring now to FIG. 5C, the sealing system includes a compressible substrate 54' engaging trim panel 50 which includes a raised pressure rib 76 molded thereinto for retaining and further compressing the substrate 54'. A sealing layer 56, such as an adhesive or compression-type seal, engages the opposite side of the substrate 54' and the track 70 of the inner door panel 42.

Figure 5D:
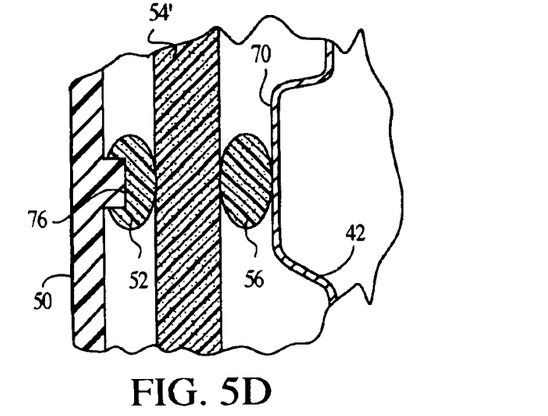

Referring to FIG. 5D, the sealing system includes a compressible substrate 54' having a first sealing layer 52 facing the trim panel 50 and a second sealing layer 56 disposed on the opposite side of the substrate 54' and facing the track 70 of the door panel. The trim panel 50 further includes a raised pressure rib 76 molded thereinto for retaining and further compressing the sealing member 52.

Figure 5E:
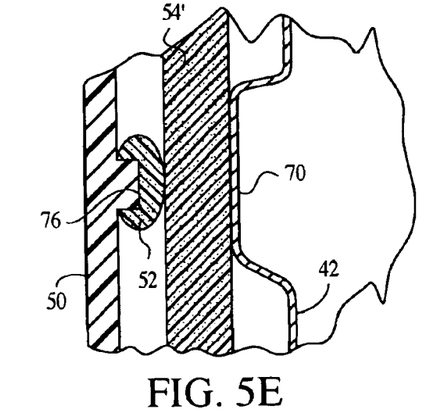

Referring to FIG. 5E, the sealing system includes a compressible substrate 54' having a sealing layer 52 facing the trim panel 50, a raised pressure rib 76 formed in the trim panel surface retaining and further compressing the sealing member 52. The opposite surface of the substrate 54' sealingly engages the track 70 of the door panel.

Figure 5F:
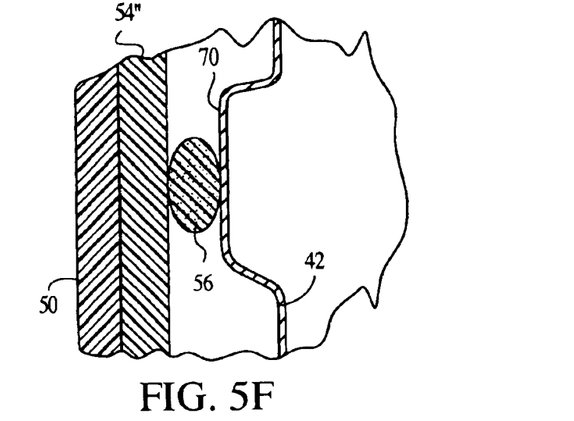

Referring now to FIG. 5F, the sealing system includes a rigid, non-compressible substrate 54" facing the trim panel 50 and a sealing member 56 engaging the raised portion 70 of the door panel 42.

In each of the embodiments shown in FIGS. 5A–5F, the trim panel and the appropriate sealing elements 52, 54, 54', 54", and 56 can be assembled at a centralized location to provide a combined trim panel and water shield to be installed as a single unit onto the door at the assembly plant. In a preferred embodiment, clips or other mechanical fasteners which are used fasten the trim panel to the door panel also fasten the sealing members to the trim panel.

Of course, in each of the embodiments shown in FIGS. 5A–5F, the track region 70 can be omitted where the door panel itself otherwise provides an adequate sealing surface.

Although a door and sealing system of given configuration are illustrated in the depicted exemplary embodiment, the present invention is not limited to any particular configuration. It will be recognized that other geometric shapes, patterns, and spatial orientations can be used to accommodate different applications or installations without in any way departing from the overall intent or scope of the invention. Likewise, continuous gaskets or beads of material need not be used, and the seals may instead comprise one or more discontinuous strips.

When a compression-type seal is used as a sealing member 52 and/or 56, the cross-sectional shape of the gasket can be modified to accommodate the particular surface to be sealed. Likewise, the resiliency of the gasket material can be selected to obtain a desired degree of sealing force. Instead of a generally solid gasket as shown in the illustrated embodiment, a hollow or tubular compression seal, e.g., having a flexible sealing portion and compressible walls, may be used.

Figure 6:
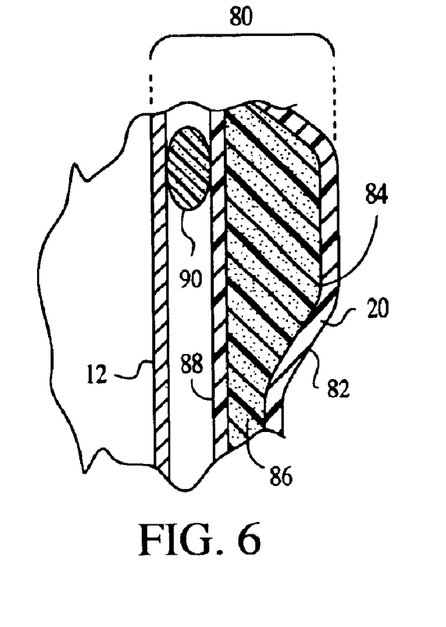
FIGS. 6–9 are fragmentary cross-sectional views of some sound-absorbing combined trim panel/water deflectors contemplated by the present invention.

A fragmentary cross-sectional view of a combined trim panel/water deflector system 80 formed in accordance with another embodiment of the development is illustrated in FIG. 6. The combined trim panel and water deflector 80 includes a trim panel layer 20, the outward surface 82 of which faces an interior compartment of a vehicle and is peripherally shaped to substantially cover an inner door panel 12. A foam layer 86 is sandwiched between the trim panel 20 and a substrate 88. The foam layer 86 is preferably an open-cell foam material, most preferably a polyurethane foam material, and provides a sound-absorbing function to reduce wind noise and other noise from entering the interior compartment of the vehicle. Since the water deflector 88 is attached directly to the trim panel, fewer holes in the part are required, thus improving air, dust, and sound sealing than conventional water deflectors. The foam material is adhesively bonded to the substrate 88 and the trim panel 20.

The foam layer 86 is advantageously compression cut to provide a nonplaniform surface which is complimentary to and mating with the inward surface 84 of the trim panel 20. The thickness of the foam layer is thus varied so as to provide a surface which matches the inward surface 84 of the trim panel 20, i.e., the foam surface has raised areas which engage complimentary recesses or depressions in the trim panel and vice versa.

The variable thickness in the foam layer 86 can be formed using a compression cutting technique. In this manner, the foam thickness can be varied in any configuration from full thickness down to near zero. The sheet is compressed between a smooth roller and a profiled roller or plate to selectively compress the foam different amounts in different regions. A cutting blade is positioned to cut the foam just as it exits the nip. In this manner, the regions that are compressed are not cut or are minimally cut and the uncompressed areas are cut more deeply.

A sealing layer 90 engages substrate 88 and inner door panel 12. In one embodiment, the sealing layer is a pressure sensitive adhesive, preferably forming a continuous ribbon or bead about the periphery of the combined trim panel and water shield 80. The use of discontinuous bands is also contemplated, and the sealing material 90 may be provided to additional areas within the peripheral bands.

In a second embodiment, sealing layer 90 comprises a compression-type seal or gasket, preferably forming a continuous seal about the periphery of the combined trim panel and water shield 80. The use of discontinuous sealing portions is also contemplated, however. The sealing material 90 may be provided to additional areas within the periphery of the area to be sealed. Preferably, the gasket is a formed-in-place (FIP) type of gasket, such as polyurethane foam or other material which is dispensed as a bead of material in its uncured state and then allowed to cure.

Irrespective of the material comprising the sealing layer 90, the trim panel is fastened to the inner door panel 12 using mechanical fasteners, such as conventional trim panel clips or the like (not shown). The thickness of the foam layer 86 is such that it will be compressed when the combined unit 80 is installed on the door, the compression providing a sufficient degree of pressurization to effect a seal.

Although the sealing layer 90 can be formed in situ at the assembly plant, it is preferable to apply the layer 90 at a centralized location. When the sealing layer 90 is preapplied, it is preferable to removably attach a protective sheet of material. When sealing layer 90 is a pressure sensitive adhesive, including both nonpermanent and substantially permanent pressure sensitive type adhesives, a release coated sheet of plastic material can advantageously be employed as the protective sheet.

Since the mechanical attachments found on the trim panel portion are used to locate the sealing system, operator sensitivity and variation in part installation is eliminated.

In a preferred embodiment, a first adhesive is used between the foam layer 86 and the substrate 88, and a second adhesive having a higher tack or tenacity than the first is used between the foam layer 86 and the trim panel 20. The foam layer 86 and trim panel 20 are thus easily removable from the substrate 88, e.g., for servicing, replacement, and so forth. When an adhesive is used as the sealing layer 90, the tack or tenacity of the adhesive 90 is likewise higher than the first adhesive.

In an alternate embodiment, an adhesive is used as the sealing layer 90 which has a lower tack or tenacity than the adhesive bonding the foam layer 86 to the trim panel shell 20 as well as the adhesive bonding the foam layer 86 to the substrate 88. In this manner, the combined trim panel and water shield 80 is removable as a single unit for servicing, repair, or replacement.

Figure 7:
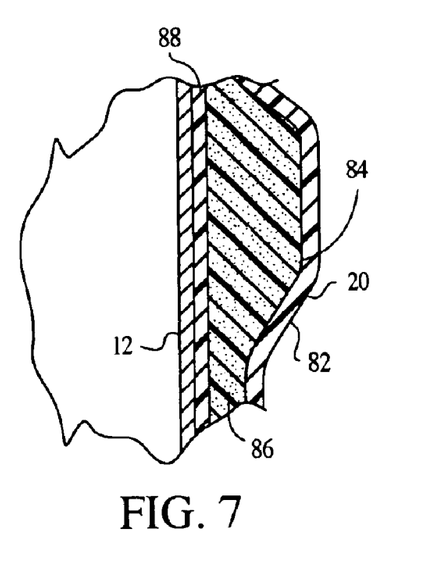

In FIG. 7, there is illustrated an embodiment substantially as described in reference to FIG. 6, but wherein the sealing layer 90 is eliminated. In the embodiment of FIG. 7, the compression of the foam material 86 that results when the unit is installed on the door effects a sealing engagement between sheet metal layer 12 and substrate layer 88.

Figure 8:
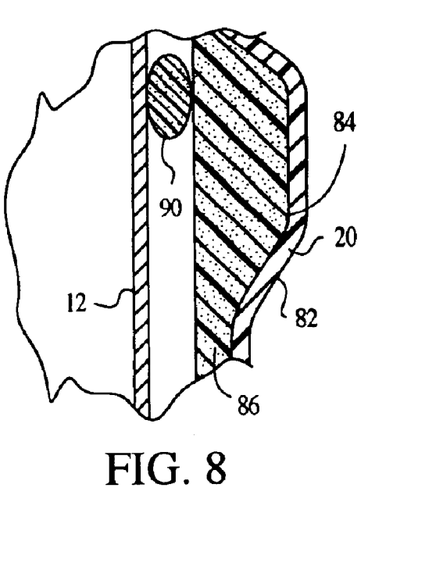
Figure 9:
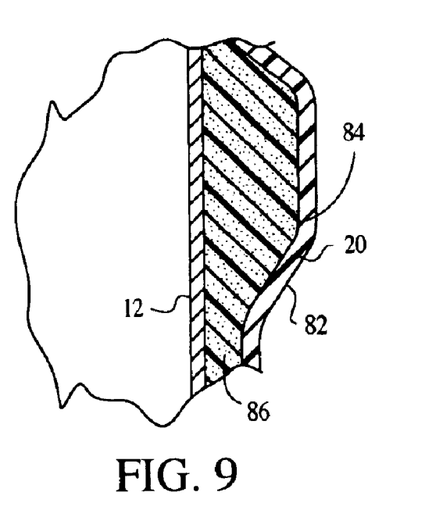

In FIGS. 8 and 9, there are shown embodiments which are as described above in reference to FIGS. 6 and 7, respectively, except that the substrate 88 is omitted.

The invention has been described with reference to the preferred embodiments. Obviously, modifications and alterations will occur to others upon a reading and understanding of this specification. The forms hereinbefore described are merely explanatory and exemplary and it is intended that the invention be construed as including all such modifications and alterations.

What is claimed is:

1. A method for sealing a vehicle trim panel mounted to a vehicle door panel against entry of water or dust, comprising:
   providing a trim panel;
   attaching a compressible water shield adapted to be disposed between the door panel and trim panel against the trim panel;
   attaching at least one compressible sealing member to the water shield;
   installing the trim panel and water shield and sealing member onto the vehicle door panel; and
   compressing the sealing member and water shield to form sealing interference between the trim panel and the vehicle door panel.

2. The method of claim 1, wherein the at least one sealing member comprises a compressible gasket engaging a peripheral edge of the trim panel.

3. The method of claim 2, wherein said gasket does not completely circumscribe the trim panel.

4. The method of claim 2, wherein said gasket completely circumscribes the trim panel.

5. The method of claim 2, further comprising a second sealing member engaging the trim panel and, when the trim panel is installed on the door panel, providing a sealing interference between the vehicle door panel and the trim panel.

6. The method of claim 5, wherein the second sealing member circumscribes one or both of an opening in the trim panel and an opening in the door panel.

7. The method of claim 1, wherein the door panel comprises a generally flat portion which is aligned with and sealingly engages the one or more sealing members when the trim panel is installed on the door panel.

8. The method of claim 1, wherein the trim panel comprises one or more pressure ribs engaging the one or more sealing members.

9. The method of claim 1, wherein the sealing member comprises a compressible foam material.

10. The method of claim 1 further comprising:
    applying a release coated protective liner over the sealing member; and
    removing the protective liner prior to the step of installing the trim panel and water shield and sealing member to the vehicle door panel.

11. A sealing system for application to a vehicle inner door panel for preventing water or dust from entering an interior compartment of the vehicle, comprising:
    a trim panel having a first surface configured to face an interior compartment of the vehicle and a second surface opposite the first surface;
    a compressible water shield adapted to be disposed between the vehicle door panel and the trim panel and against the first surface of the trim panel; and
    a sealing member engaging the water shield and the vehicle door panel and providing a sealing interference between the vehicle door panel and the trim panel when the sealing system is installed on the door panel.

12. The sealing system of claim 11, wherein the sealing member is an adhesive.

13. The sealing system of claim 11, wherein the sealing member is a removable pressure-sensitive adhesive.

14. The sealing system of claim 11, wherein the sealing member is a generally permanent pressure-sensitive adhesive.

15. The sealing system of claim 11, wherein the sealing member is compressible forming a compression-type gasket when the trim panel is attached to the vehicle door panel.

16. The sealing system of claim 11, wherein the sealing member is a compressible formed-in-place gasket.

17. The sealing system of claim 11, wherein the water shield is a foam material.

18. The sealing system of claim 17, wherein the water shield is an open-cell foam material.

19. The sealing system of claim 17, wherein the water shield is a closed-cell foam material.

20. The sealing system of claim 11, further comprising a release coated protective liner applied over the sealing member for removal prior to the installation of the trim panel to the vehicle door panel.

21. The method of claim 11, wherein the sealing member is an adhesive.

22. The method of claim 1, wherein the sealing member is a removable pressure-sensitive adhesive.

23. The method of claim 1, wherein the sealing member is a generally permanent pressure-sensitive adhesive.

24. The method of claim 1, wherein the sealing member is compressible forming a compression-type gasket when the trim panel is attached to the vehicle door panel.

25. The method of claim 1, wherein the sealing member is a compressible formed-in-place gasket.

26. The method of claim 1, wherein the water shield is a foam material.

27. The method of claim 1, wherein the water shield is an open-cell foam material.

28. The method of claim 1, wherein the water shield is a closed-cell foam material.

* * * * *